United States Patent
Rabideau et al.

(10) Patent No.: US 6,598,014 B1
(45) Date of Patent: Jul. 22, 2003

(54) CLOSED-LOOP MULTISTAGE BEAMFORMER

(75) Inventors: Daniel Rabideau, Acton, MA (US); Michael Zatman, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 375 days.

(21) Appl. No.: 09/692,871

(22) Filed: Oct. 20, 2000

Related U.S. Application Data

(60) Provisional application No. 60/160,812, filed on Oct. 21, 1999.

(51) Int. Cl.[7] .............................................. G06F 15/00
(52) U.S. Cl. ........................ 702/194; 702/189; 702/190; 702/191; 342/378; 375/148
(58) Field of Search .................................. 342/378, 379, 342/382, 383; 375/148; 600/443; 702/189, 190, 191, 194

(56) References Cited

U.S. PATENT DOCUMENTS 4,780,721 A * 10/1988 Dobson ...................... 342/178
6,482,160 B1 * 11/2002 Stergiopoulos et al. ..... 600/443

* cited by examiner

Primary Examiner—John Barlow
Assistant Examiner—Stephen J. Cherry
(74) Attorney, Agent, or Firm—Samuels, Gauthier & Stevens, LLP

(57) ABSTRACT

A system and method of tracking ambient signals, detecting or receiving desired signals, and suppressing undesired signals. An array of sensors receives ambient signals and generates N channels of data. A transformation device accepts the data from the array and generates N' channels of data. An adaptive processor accepts the N' channels of data from the output of the transformation device and processes the N' channels of data to update the settings of the transformation device, such that only N' degrees of freedom are adaptively manipulated by the adaptive processor at an instant, the manipulation being done in a manner that instantaneously senses changes in signal environment and adjusts the settings of the transformation device in a closed-loop. The adaptive processor optionally combines these N' channels to produce system output beam(s) that remove residual interference present out the output of the transformation device. Over time, the adaptive processor controls all N degrees of freedom adaptively, thus nulling and tracking performance is then limited by the N degrees of freedom and not the N' degrees of freedom that are actually used adaptively at any instant.

24 Claims, 9 Drawing Sheets

| Jammer Direction | Jammer turns "on" | Detection Occurs, Initial Estimate Made | Refinement Beams Used | Convergence Occurs, Final Estimate Made | Jammer Nulled By SECOND Stage | Jammer Nulled By FIRST Stage | SUMMARY OF OPERATION Jammer in Acquisition State | Jammer in Nulling State |
|---|---|---|---|---|---|---|---|---|
| 60° | 1 | 1 | 2 | 2 | 1-2 | 3-160 | 1-2 | 3-160 |
| 130° | 11 | 11 | 12 | 12 | 11-12 | 13-160 | 11-12 | 13-160 |
| 30° | 21 | 21 | 22 | 22 | 21-22 | 23-160 | 21-22 | 23-160 |
| 100° | 31 | 31 | 32 | 32 | 31-32 | 33-160 | 31-32 | 33-160 |
| 50° | 41 | 41 | 42 | 42 | 41-42 | 43-160 | 41-42 | 43-160 |
| 160° | 51 | 51 | 52 | 52 | 51-52 | 53-160 | 51-52 | 53-160 |
| 10° | 61 | 61 | 62 | 62 | 61-62 | 63-160 | 61-62 | 63-160 |
| 40° | 71 | 71 | 72 | 72 | 71-72 | 73-160 | 71-72 | 73-160 |
| 20° | 81 | 81 | 82 | 82 | 81-82 | 83-160 | 81-82 | 83-160 |
| 140° | 91 | 91 | 92 | 92 | 91-92 | 93-160 | 91-92 | 93-160 |
| 170° | 101 | 101 | 102 | 102 | 101-102 | 103-160 | 101-102 | 103-160 |
| 70° | 111 | 111 | 112 | 112 | 111-112 | 113-160 | 111-112 | 113-160 |
| 80° | 121 | 121 | 122 | 122 | 121-122 | 123-160 | 121-122 | 123-160 |
| 110° | 131 | 131 | 132 | 132 | 131-132 | 133-160 | 131-132 | 133-160 |
| 120° | 141 | 141 | 142 | 142 | 141-142 | 143-160 | 141-142 | 143-160 |
| 150° | 151 | 151 | 152 | 152 | 151-152 | 153-160 | 151-152 | 153-160 |

*Fig. 5*

| Jammer Direction | Jammer turns "on" | Detection Occurs, Initial Estimate Made | Refinement Beams Used | Convergence Occurs, Final Estimate Made | Jammer Nulled By SECOND Stage | Jammer Nulled By FIRST Stage | SUMMARY OF OPERATION | |
|---|---|---|---|---|---|---|---|---|
| | | | | | | | Jammer in Acquisition State | Jammer in Nulling State |
| 60° | 1 | 1 | 2 | 2 | 1-2 | 3 – 160 | 1-2 | 3 – 160 |
| 130° | 11 | 11 | 12 | 12 | 11 – 12 | 13 – 160 | 11 – 12 | 13 – 160 |
| 30° | 21 | 21 | 22 - 23 | 23 | 21 – 23 | 24 – 160 | 21 – 23 | 24 – 160 |
| 100° | 31 | 31 | 32 | 32 | 31 – 32 | 33 – 160 | 31 – 32 | 33 – 160 |
| 50° | 41 | 41 | 42 - 43 | 43 | 41 – 43 | 44 – 160 | 41 – 43 | 44 – 160 |
| 160° | 51 | 51 | 52 - 53 | 53 | 51 – 53 | 54 – 160 | 51 – 53 | 54 – 160 |
| 10° | 61 | 61 | 62 | 62 | 61 – 62 | 63 – 160 | 61 – 62 | 63 – 160 |
| 40° | 71 | 71 | 72 - 73 | 73 | 71 – 73 | 74 – 160 | 71 – 73 | 74 – 160 |
| 20° | 81 | 81 | 82 - 83 | 83 | 81 – 83 | 84 – 160 | 81 – 83 | 84 – 160 |
| 140° | 91 | 91 | 92 | 92 | 91 – 92 | 93 – 160 | 91 – 92 | 93 – 160 |
| 170° | 101 | 101 | 102 - 103 | 103 | 101 – 103 | 104 – 160 | 101 – 103 | 104 – 160 |
| 70° | 111 | 111 | 112 | 112 | 111 – 112 | 113 - 160 | 111 – 112 | 113 - 160 |
| 80° | 121 | 121 | 122 | 122 | 121 – 122 | 123 – 160 | 121 – 122 | 123 – 160 |
| 110° | 131 | 131 | 132 | 132 | 131 – 132 | 133 – 160 | 131 – 132 | 133 – 160 |
| 120° | 141 | 141 | 142 | 142 | 141 - 142 | 143 – 160 | 141 – 142 | 143 – 160 |
| 150° | 151 | 151 | 152 | 152 | 151 - 152 | 153 - 160 | 151 - 152 | 153 - 160 |

*Fig. 9*

CLOSED-LOOP MULTISTAGE BEAMFORMER

PRIORITY INFORMATION

This application claims priority from provisional application Ser. No. 60/160,812 filed Oct. 21, 1999.

This invention was made with government support under Contract Number F19628-95-C-0002 awarded by the Air Force. The government has certain rights in the invention.

BACKGROUND OF THE INVENTION

The invention relates to adaptive beamforming, and in particular to a closed-loop multistage beamformer.

In this application, the following notation will be used. Bold upper and lower case letters will denote matrices and vectors, respectively. Scalars are italicized. Superscript H denotes conjugate transposition. Expectation is denoted by $E\{\cdot\}$. Other nomenclature is summarized in Table 1

To avoid confusion, Table 2 defines some terminology as it will be used in this application. Applicants are careful to point out the duality between spatial array processing and other related applications. The subsequent presentation will consider only multi-sensor (spatial) array processing; however, it should be understood that the principals of the architecture could easily be employed in these other applications as well.

In general, sensor arrays are capable of rejecting undesirable interference and recovering signals of interest. When the characteristics of the interference are unknown, smart signal processing techniques can be used to "adapt" to the interference. This information can then be used to reject the undesired interference. This type of processing is broadly termed "Adaptive Beam Forming" (ABF). For over 30 years, different "smart sensor" algorithms (and the beamforming hardware required to implement them) have been developed to accomplish this goal. To evaluate these techniques, one typically measures their performance, i.e., their ability to recover signals and suppress interference. One also considers the cost of building suitable array hardware (e.g., receivers and I/O links) and signal processing hardware (e.g., nonadaptive and adaptive filters) as required to implement these algorithms. The goal, of course, is to select techniques that attain a very high level of interference suppression at a low cost.

Oftentimes, sensor arrays are designed to have large apertures, obtaining very high sensitivity levels. Such arrays may be highly digitized (either at the element or subarray levels) to improve performance (e.g., by increasing the dynamic range and/or improving system sensitivity and interference rejection). This high level of digitization results in many "degrees of freedom" (DOFs) that can be used for adaptive beamforming. However, the processing hardware required to exploit these DOFs can be prohibitive.

DOFs can be exploited in a fixed fashion, an adaptive fashion, an instantaneously adaptive fashion, or some combination thereof. Applicants associate the type of DOF exploitation with the degree of flexibility possible within an array processing system at design time. A fixed DOF refers to a DOF that can not be adjusted by the processor in a real-time data-dependent fashion. Fixed DOFs are thus maximally inflexible. An adaptive DOF, as defined here, refers to a DOF that can be under real-time processor control, i.e., it can be controlled in a data-dependent fashion. Adaptive DOFs are thus somewhat flexible. An instantaneously adaptive DOF, on the other hand, refers to an adaptive DOF that is under the direct control of the processor at some given instant. Instantaneously adaptive DOFs are thus maximally flexible. Note that this latter term is introduced specifically to distinguish the operation of the invention from that of other ABFs.

To clarify these methods of DOF exploitation, an analogy is offered. A sensor array is analogous to a black box with a large number of control knobs on the outside. A DOF can be thought of as a single control knob. An operator (the processor) monitors the operation of the black box, and adjusts control knobs as needed. A fixed DOF can be thought of as a control knob that the operator is not permitted to touch. An adaptive DOF can be thought of as a control knob that an operator could move. An instantaneously adaptive DOF can be thought of as a control knob that is actually being manipulated (by the operator) at some given instant. Note that while the number of control knobs may be large, the operator may not be capable of turning them all at once. Hence the number of instantaneously adaptive DOFs may be much lower than the number of adaptive DOFs.

Next, the adaptive beamforming problem can be succinctly stated as follows. Suppose one has a sensor array that produces N digitized channels. As such, there are a total of N DOFs available. A sample vector (a.k.a. snapshot) associated with processing time k is given by the N×1 column vector, $x_k$. The matrix $X_k$ denotes a N×L set of snapshots at this time. The interpretation of $x_k$ and $X_k$ will depend on the specific array processing application. For example, in some radar fields $x_k$ would be a single snapshot from CPI k, and $X_k$ would be the set of all snapshots from CPI k. These snapshots contain energy from J jammers and noise. The task is to build a filter capable of suppressing this interference while receiving signals from direction $\Theta$.

There are currently two general classes of ABF techniques that might be used to solve this problem. The first general class of ABF techniques is called Fully Adaptive Beam Forming (Full ABF). Full ABF methods use snapshots from all N DOFs (simultaneously) to adapt to the jamming in this N dimensional space. In this sense, Full ABF works with N instantaneously adaptive DOFs. For representative techniques, see B. Van Veen, "Beamforming: a versatile approach to spatial filtering," IEEE ASSP Magazine, April 1988, section IV-V, incorporated herein by reference.

Full ABF thus requires the hardware to simultaneously collect and process data from all N channels. For many algorithms in this class, processing complexity grows as $N^3$. Thus, for large digitized arrays (i.e., large N), the processing complexity and associated size, weight and power can be quite large. Furthermore, the convergence time of the adaptive algorithm typically increases proportional to N. Thus, for large, highly digitized arrays, a large training interval will be required (this is also quite undesirable). Furthermore, adaptive beamforming is typically proceeded by other processing (e.g., filtering) which might then be performed on all N channels, adding to complexity. Lastly, the adaptive processor itself is often situated in a location that is separated from the array (e.g., below deck on a ship). Thus, Full ABF requires a communication network with enough bandwidth to carry all N channels of the array data to the processor.

With sufficient training data, Full ABF techniques will achieve near optimal performance—albeit at a high cost. Problems occur, however, when sufficient training data is not available, or costs are constrained.

The second general class of ABF techniques attempts to achieve good performance (in restricted environments) and rapid convergence at a greatly reduced cost. These techniques, collectively known as Beamspace Adaptive Beam Forming (Beamspace ABF), achieve this goal by accepting poorer performance in environments with a large number of jammers.

Beamspace ABF begins by mapping the N array channels into N' beams prior to adaptive interference rejection, as shown in FIG. 1. In this sense, Beamspace ABF works with only N' instantaneously adaptive DOFs (the remaining N–N' DOFs are all fixed DOFs). This mapping is determined by a N×N' linear transformation matrix, T, which is called the "beamspace transformation matrix." The beamspace transformation is used to create a set of N' ×1 beamspace snapshot vectors, $Y_k$, via:

$$Y_k = T^H X_k \quad (1)$$

(a single such beamspace vector is denoted $y_k$).

Next, adaptive processing is performed with the goal of adapting to the jamming. This processor has access only to the beamspace snapshots. Thus, the adaptation can be viewed as taking place within a N' dimensional space. For representative techniques, see B. Van Veen, "Beamforming: a versatile approach to spatial filtering," IEEE ASSP Magazine, April 1988, section VI, incorporated herein by reference. At this stage, the adaptation methods that are employed are analogous to those used in Full ABF. Consequently, the factors described above (adaptation complexity, size, weight, power, convergence rate, availability of training data, and bandwidth) are all functions of N' instead of N. As N' is usually much less than N, this yields a substantial reduction in required resources.

The price paid for this reduction in resources is performance, especially when the number of important jammers (i.e., jammers radiating powers that exceed the sidelobe suppression of the mainbeam), J, is large. In a radar context, the optimal filter for rejecting the interference in $y_k$ is the Wiener filter:

$$w_k = R_k^{-1}(T^H d)$$

$$z_k = w_k^Y y_k \quad (2)$$

where $$R_k = E\{y_k y_k^H\}$$

and d is a vector containing the array's response to a target signal of interest.

As long as N'>J, the matrix T can be chosen to yield near-optimal interference suppression. However, if N'≦J one cannot, in general, suppress all interference by merely combining elements of $y_k$.

The apparent implications & drawbacks of this statement are ominous. First, only N'–1 jammers can be completely cancelled. In practice, the actual number of jammers can be expected to vary with time. As a result, the real-time processing hardware must be in-place to support the maximum number of jammers anticipated. All resources required to accommodate this N' must be continuously available, even when the current jamming environment does not require them. Because the maximum number of jammers could be very large, only marginal reductions in required resources may be realized as compared with Full ABF.

Second, proper selection of T can be costly. Generally speaking, the best beamspace consists of a set of beams spanning the jamming subspace. This implies prior knowledge about the jamming which, in turn, can be gained by open-loop spectral/parameter estimation applied to the raw channel data. However, these techniques can be costly and/or time consuming. To reduce this cost, it has been proposed that only a subset of elements be used by the open-loop spectral estimator, with superresolution supplying some of the missing resolution. However, this approach is then limited in the rank of the subspace that it can remove (and perhaps also in the accuracy to which the jamming position is known).

SUMMARY OF THE INVENTION

The CLM-ABF invention is a method and system for doing adaptive beam forming. In the process of forming these beams, it explicitly tracks source signals (not limited to their angles-of-arrival). In an exemplary embodiment, both functions (i.e., beamforming and tracking) are performed simultaneously. However, it is possible to use the invention in a mode wherein only sources are tracked (i.e., the creation of final beams is turned off).

CLM-ABF processes data from a large digitized array. CLM-ABF begins by using a very simple transformation device to reduce the amount of array data. The resulting transformed data is then adaptively processed to track signals and form beams. It will be appreciated that the initial data reduction is important here because it reduces many costs associated with adaptive processing, i.e., those that increase with the amount of data. This adaptive processor also controls the transformation device, providing additional mitigation of interference. In this sense, CLM-ABF processes only N' DOFs in an instantaneously adaptive fashion, with the remaining N–N' DOFs also being adaptive, albeit at a slower rate.

The number of sources that can be tracked and nulled by CLM-ABF depends on the size of the array (i.e., number of sensors) and not upon the amount of data that is actually processed by the second (adaptive) processing stage. That is, the number of "instantaneously adaptive DOFs" does not limit tracking and nulling performance even though the number of instantaneously adaptive DOFs is much smaller than the total number of DOFs).

The built-in source tracking, estimation and stage-1 null steering is done in a closed-loop fashion. As a result, the processor can truly null jammers, i.e., the achievable null depths are similar to those attained by standard adaptive methods (e.g., LMS, or SMI) and not limited due to sensor manifold miscalibration, improper DOF selection, or other error sources.

Accordingly, the invention provides, a system and method of tracking ambient signals, detecting or receiving desired signals, and suppressing undesired signals. An array of sensors receives ambient signals and generates N channels of data. A transformation device accepts the data from the array and generates N' channels of data. An adaptive processor accepts the N' channels of data from the output of the transformation device and processes the N' channels of data to update the settings of the transformation device. Only N' degrees of freedom are adaptively manipulated by the adaptive processor at any instant, the manipulation being done in a manner that instantaneously senses changes in signal environment and adjusts the settings of the transformation device in a closed-loop. The adaptive processor optionally combines these N' channels to produce system output beam (s) that remove residual interference present out the output of the transformation device. Over time, the adaptive processor controls all N degrees of freedom adaptively, thus nulling and tracking performance is then limited by the N degrees of freedom and not the N' degrees of freedom that are actually used adaptively at any instant.

BRIEF DESCRIPTION OF THE DRAWINGS

FIG. 5 is a table showing the times (i.e., CPI numbers) corresponding to CLM control process events;

FIG. 9 is a table showing times (i.e., CPI numbers) corresponding to CLM control process events when mutual coupling was present;

DETAILED DESCRIPTION OF THE INVENTION

The invention is directed to a new approach to high performance adaptive beamforming with large arrays, called Closed-Loop Multistage Adaptive Beam Forming (CLM-ABF). Compared with Beamspace ABF, CLM-ABF involves a hardware modification combined with a creative combination of spectral/parameter estimation, subspace tracking, and beamforming. CLM-ABF is capable of canceling up to N−1 jammers using only N' instantaneously adaptive DOFs. Each jammer can be moving, stationary, or some combination thereof. This is accomplished at a fraction of the cost of a fully adaptive beamformer. A distinction will be made between what is traditionally called "adaptive DOFs" and "instantaneously adaptive DOFs." The following description will explain how this is done.

Figure 1:
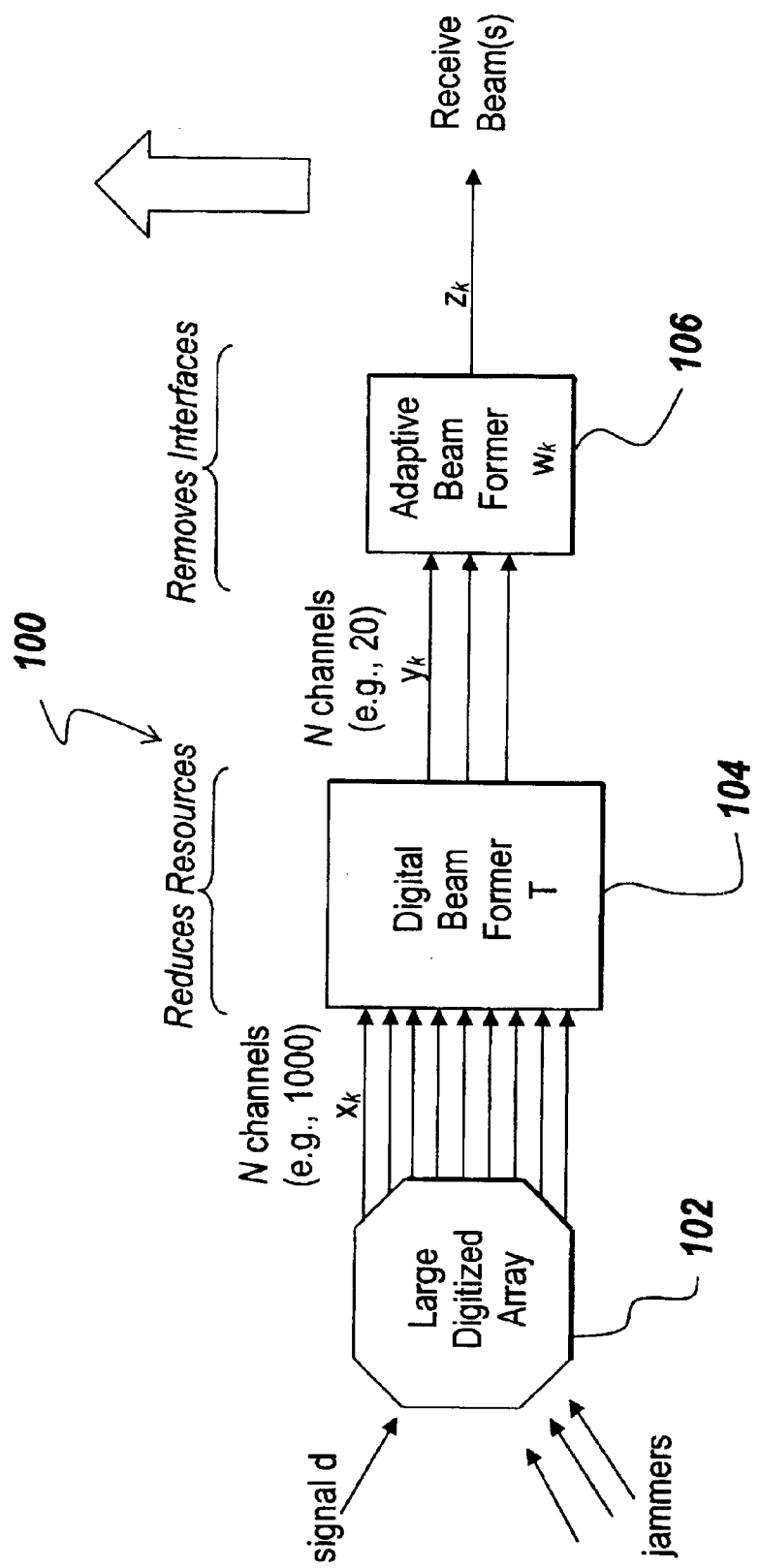
FIG. 1 is a schematic block diagram of a conventional beamspace adaptive beamformer.
Figure 2:
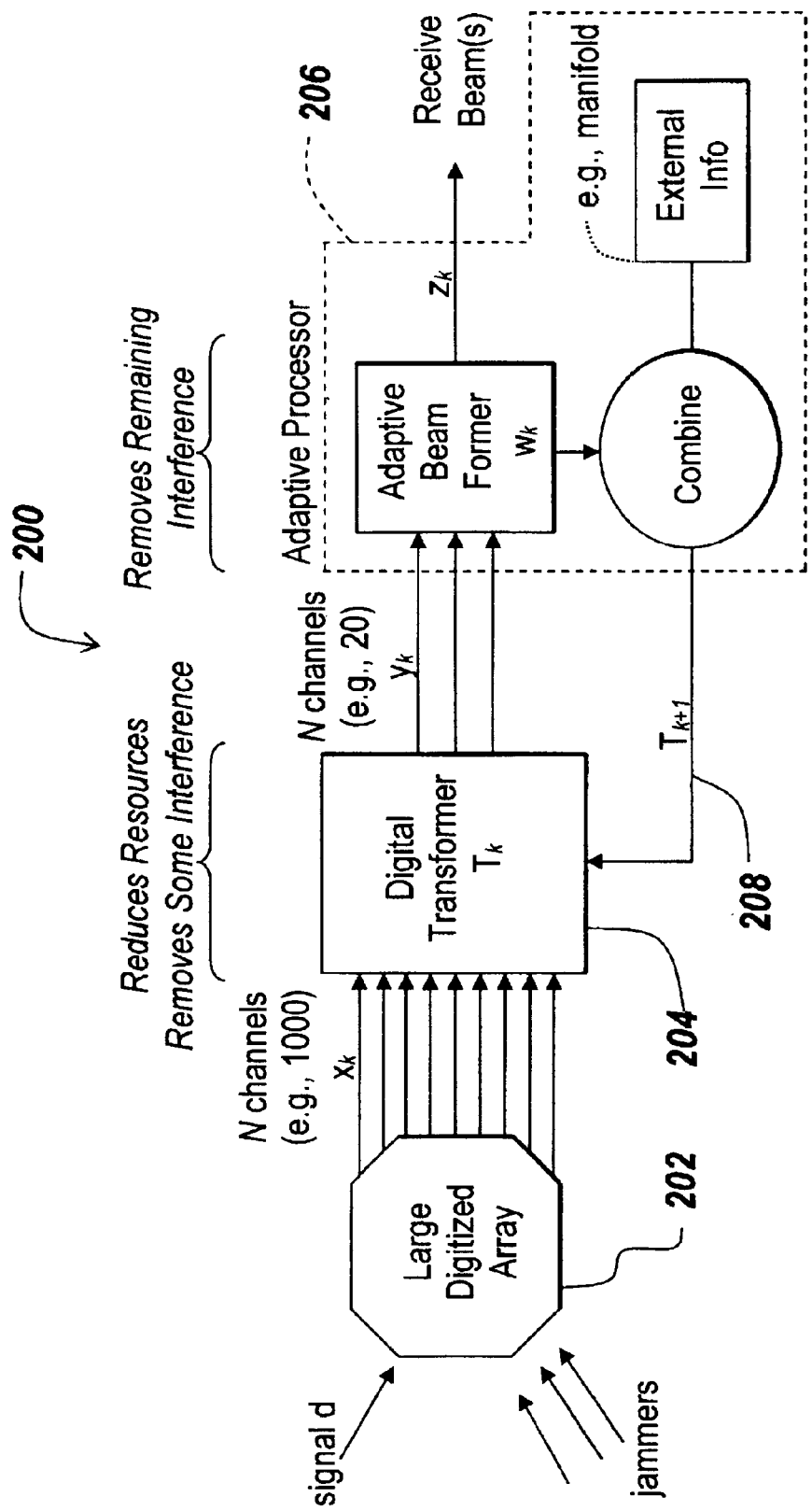
FIG. 2 is a schematic block diagram of a closed loop multistage adaptive beamformer in accordance with the invention.

FIG. 2 is a schematic block diagram of an exemplary embodiment of a CLM-ABF interference canceller 200 in accordance with the invention. The beamformer 200 includes a large digitized array 202, a digital transformer 204 and an adaptive processor 206.

The digital transformer 204 can be a real-time re-programmable digital transformation device that reduces the number of DOFs from N to N' by producing main beams (in which desired signals are sought) and a small number of other channels.

The adaptive processor 206 operates on the outputs of the digital transformer. It uses these outputs for two purposes: (1) rejection of interference and (2) control processing.

A control link 208 is provided to feed filter weights, or equivalently the control parameters used to create them, from the adaptive processor back to the digital transformation device.

A detailed overview of these components, beginning with the digital transformation device 204, will be given next. In this description, it is assumed that the current time index is k. Typically, each processing element operates on a set of data available at time k (denoted by subscript k). In some cases, processing parameters are adjusted for use during the next time step (denoted by subscript k+1).

The large digitized array 202 is assumed to produce N channels. These channels are to be processed by CLM-ABF. The first CLM-ABF stage (204) maps these N array channels into N' beams, as shown in FIG. 2. This mapping is determined by the N×N' digital transformation matrix, $T_k$. This transformation creates a set of N'-dimensional transformed snapshot vectors, $Y_k$, via:

$$Y_k = T_k^H X_k.$$

Data from the digital transformation device 204 is then passed to the adaptive processor 206. Then (after the adaptive processor has performed its control function) a new set of weights, $T_{k+1}$, are loaded into the digital transformation device. These weights are used in the subsequent transformation at time k+1.

The column space of the digital transformation matrix can be thought of as a set of beams. These beams can be decomposed into two sets: "main" beams and other beams. The number of main beams is n'. The number of other beams is m'. Together, N'=n'+m'.

The n' main beams are chosen to enhance target detection and estimation. In a radar context, for example, suppose it is desired to receive signals from a single direction Θ. Typically, the n' main beams would then consist of a single beam focussed toward Θ, plus n'−1 estimation beams, i.e., beams used to enhance the estimation of target positions, through monopulse-like techniques, maximum likelihood estimation, or other "beam splitting" methods (e.g., utilizing "difference" beams, or beams steered near Θ).

The m' other beams are chosen to aid in detecting and estimating jammers, and to enhance the nulling of jammers. These m' other beams are composed of r refinement beams and α auxiliary beams. Note that both r and α may be adjusted by the adaptive processor, but the sum r+α is always equal to the constant m'.

Auxiliary beams are designed to cover the region corresponding to all possible jammers. For example, if it is assumed that jamming can arise in any direction, then the auxiliary beams would be designed to have patterns that are approximately omni-directional. These auxiliary beams must be distinct, of course. This can be accomplished, for example, by varying their phase centers or their patterns. These auxiliary beams are used principally in the detection of "new" jamming sources, and the initial estimation of their parameters.

Refinement beams, in contrast, are chosen to have responses that span certain estimated jammer subspaces. For example, if a jammer is detected and estimated to have parameter vector ψ, then some of the refinement beams would be tuned to receive signals near ψ. This is intended to improve subsequent estimates of the jammer parameter vector.

Note that once a jammer's parameters (subspace) have been estimated accurately, refinement is complete (for this jammer) and the refinement beams are no longer allocated to this jammer. {Refinement beams may be re-allocated later to "update" the estimated jammer parameters.} Instead, all N' subsequent beams are modified to null this estimated jammer. It is important to observe, then, that all stage 1 beams (even the omni-like auxiliaries) can have nulls.

Next, the adaptive processor 206 will be considered. At each time, k, the adaptive processor 206 operates on data provided by the digital transformation device. It performs two principle functions:

1. Cancellation of the interference present in the N'-dimensional beamspace data at time k.

2. Control processing that extracts jammer information with the purpose of updating the subsequent digital transformation in a way that improves performance.

These two functions are not really independent because the second function influences the subsequent performance of the first. Likewise, many computations needed to perform the first function can often be re-used for the second.

Consider the first function: cancellation of interference present in the N'-dimensional beamspace data at time k. Observe that this is the same function that is performed by the adaptive beamforming stage of Beamspace-ABF. As a consequence, similar algorithms such as those earlier described can be employed here. In a radar context, for example, the optimal filter for rejecting the interference in $y_k$ is the Wiener filter:

$$w_k = R_k^{-1}(T_k^H d)$$
$$z_k = w_k^H y_k \qquad (3)$$

where $$R_k = E\{y_k y_k^H\}$$

and d is a vector containing the array's response to a target signal of interest.

Next, consider the adaptive processor's second function: control processing. This control processing updates the digital transformation for time k+1, i.e., $T_{k+1}$. This updating process is important because it will directly influence the adaptive processor's ability to perform its first function in the future. That is, at time k+1, the CLM-ABF jammer-nulled output will be:

$$z_{k+1} = w_{k+1}^H y_{k+1}.$$

Now, since $y_{k+1} = T_{k+1}^H x_{k+1}$, one can write $$z_{k+1} = \tilde{w}_{k+1}^H x_{k+1}.$$

where $\tilde{w}_{k+1} = T_{k+1} w_{k+1}$. Hence, the effective N-dimensional weights at time k+1 will depend directly on the selection of $T_{k+1}$!

The adaptive processor should choose $T_{k+1}$ based on what the adaptive processor has learned about the jamming. If no "new" jammers have been detected recently, the processor will generally choose to use m' broad auxiliaries during the next time step. This enhances the detection of new sources (if they exist then) and the initial estimation of their parameters.

On the other hand, if a "new" jamming source has been detected the processor will attempt to estimate its parameters. If these parameters are not accurately known, then the adaptive processor will also re-steer some digital transformation beams in an attempt to span the jamming signal (referred to as "refinement" beams previously). This improves the ability of the adaptive processor to subsequently perform its first function. It also improves the adaptive processor's subsequent re-estimation of the jammer parameters. This phase of operation is termed "acquisition."

During acquisition, nulling of this jammer is performed in CLM-ABF stage 2 (206) through the use of the N' instantaneously adaptive DOFs available there.

After this jammer's parameters are accurately known, the adaptive processor chooses the next transformation, $T_{k+1}$, to null the jammer. Consequently, the null is applied using the N DOFs available in CLM-ABF stage 1 (204). The N' instantaneous adaptive DOFs available in stage 2 are not used (hence these DOFs are released for other uses). This is the reason that CLM-ABF manipulates N adaptive DOFs, but only N' are instantaneously adaptive. Finally, it is noted here (and will be discussed in more detail later) that the transformations, $T_{k+1}$, are occasionally modified by the adaptive processor to allow "updating" of previously acquired jammer parameters.

The role of the beam control link 208 will now be described. The beam control link 208 is a communication link used to carry beam steering information from the adaptive processor 206 to the digital transformer 204. Nominally, this link would carry the digital transformation matrices $T_k, T_{k+1}, T_{k+2}, \ldots$ and so on. Of course, sending the control parameters used in creating these matrices, instead of the matrices themselves, is functionally equivalent (because the digital transformation device could then process the control information to create these matrices).

Figure 3:
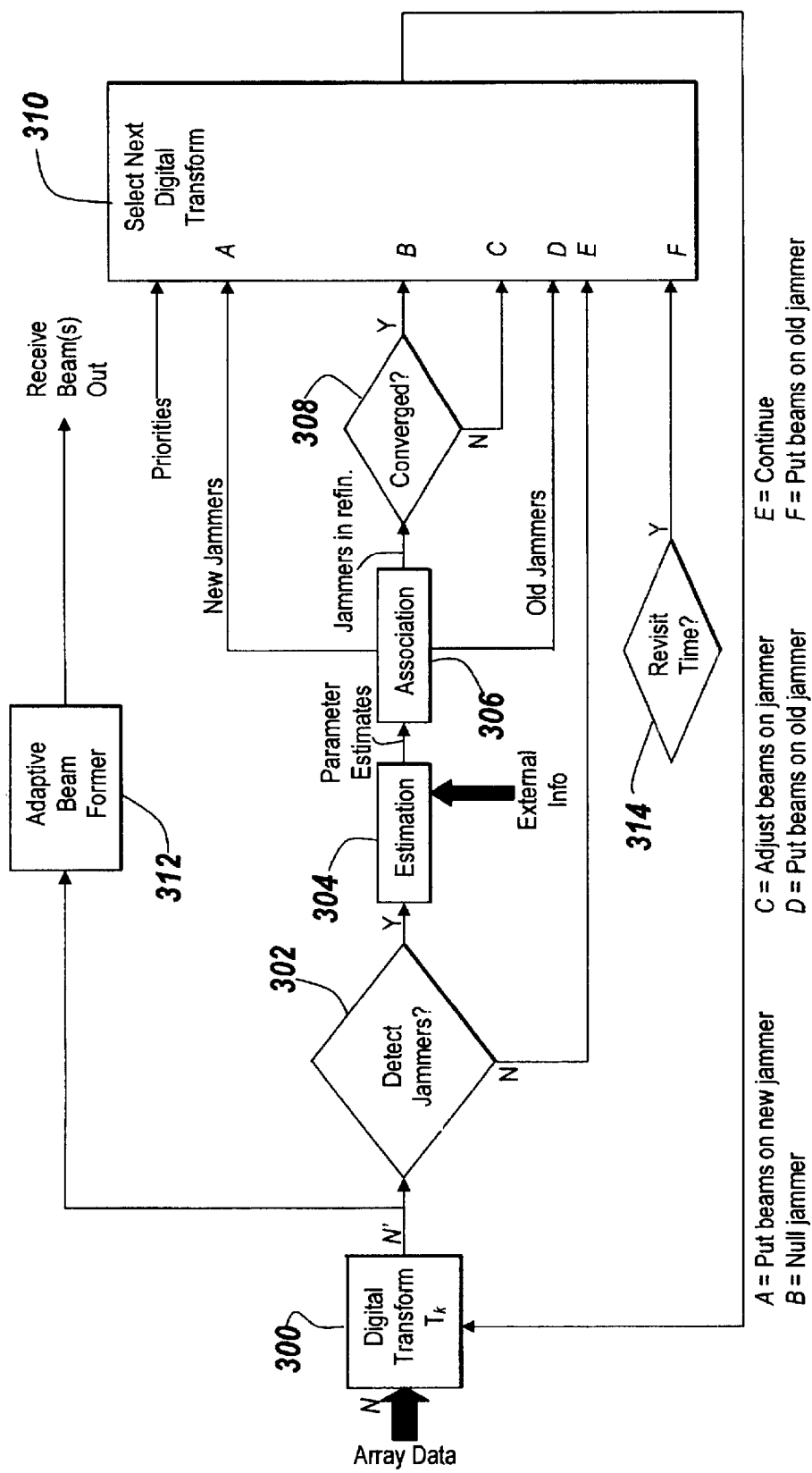
FIG. 3 is an expanded flow diagram for CLM-ABF in accordance with the invention.

This completes the brief description of the digital transformation device (204), adaptive processor (206), and beam control link(208). An expanded description of the approach CLM-ABF uses for controlling the stage 1 digital transformation will now be provided. To aid in the description, an expanded flow-chart illustrating the various processing tasks performed by CLM-ABF is provided in FIG. 3.

In regard to each jamming source, the CLM-ABF control process can be in one of three nominal states: acquisition, nulling, or updating.

In the acquisition state, the processor looks for new jamming sources. When a new source is detected, its parameters are estimated and used to re-steer the stage 1 beams. This enhances the subsequent cancellation of jammers by the stage 2 adaptive processor. It also enhances the subsequent re-estimation of the jammer parameters by the adaptive processor.

Once jammer parameters are known accurately, CLM-ABF transitions the jammer from the acquisition state to the nulling state. In the nulling state, CLM-ABF attempt to mitigate the jammer by steering nulls within the stage 1 transformation device. From within the nulling state, CLM-ABF may also transition the jammer to the updating state (wherein jammer parameters are updated). This can be done in a pre-scheduled, periodic fashion (so as to "re-visit" each jammer and update its parameters) or in an automated, data-driven fashion.

A detailed description of these three states (i.e., acquisition, nulling and updating) and the functions performed therein will now be provided.

In the acquisition state, the acquisition of new jammers is performed in three phases: detection, initial estimation, and refinement. Each of these functions can be implemented by adapting one or more techniques from the literature. Because of this, the focus will be on how these functions complement each other and not the specifics of how each function is implemented. For the sake of clarity, however, examples will be given of how the functions could be implemented.

The purpose of jammer detection (302) is to identify the presence of (1) new jamming sources or (2) old (i.e., previously acquired) sources that, for one reason or another, are inadequately nulled by the first stage (e.g., a jammer may have moved since its parameters were last acquired and used to steer nulls, or there may be residual jamming due to errors in prior jammer parameter estimates). Jammer detection has been studied in the literature, and a suitable method can be adapted.

For example, at time k a matrix is first constructed of recent beamspace snapshots, $Y_k$. Then, its singular value decomposition is computed, $Y_k = U_k S_k V_k^H$. Finally, the size of the singular values are compared to a threshold, telling if jammers are present and how many. Relatively large singular values will correspond to strong signals, while small singular values generally correspond to noise. For high signal-to-noise-ratios, there is a sharp transition between large and small singular values. The transition point can be used as an estimate of the dimensionality of the interference present in the beamspace data, J' (a value greater than one corresponds to a "detection"). For lower signal-to-noise-ratios, the transition is more gradual. For these cases, there is a rich literature consisting of techniques that may be used. See I. J. Akaiki, "A new look at statistical model identification," IEEE Transactions on Automatic Control, pp. 716–723, 1974; M. Wax, and T. Kailath, "Detection of signals by information theoretic criteria," IEEE Transactions on Acoustics, Speech and Signal Processing, vol. ASSP-33, no. 2, pp. 387–392, April 1985; J. Rissanen, "Modeling by Shortest Data Description," Automatica, pp465–471, 1978; all of which are incorporated herein by reference.

After a new jammer(s) has been detected, CLM-ABF will (over several time steps) form a high-quality estimate (304) of the jammer(s) ("high quality" is needed so that the jammer can be nulled by a subsequent stage 1 transformation). This jammer estimation process can be notionally divided into two phases: initial estimation and refinement.

The initial estimation phase occurs directly after the jammer(s) is detected (i.e., during the same time index). Jammer parameters are estimated from the existing beamspace data. This beamspace is likely to be highly suboptimal due to the absence of prior jammer knowledge during the selection of those beams (e.g., in a typical situation the existing beamspace would include a main beam steered away from the jammer, and omni-like auxiliaries; there typically are no beams steered toward the new jammer(s) initially). Nonetheless, this data is used to form an initial estimate of the jammer parameters.

These estimates are then used to create a set of refinement beams that are better tuned to the jammer subspace (in fact, it is desirable that they span this subspace). These refinement beams will be used during the next time index. As shall be proven later, directly estimating the jammer from only the existing beamspace data is undesirable. In general, external information needs to be used (i.e., information not contained within the data snapshots produced by transformation $T_k$). A simple approach (suited to a well-calibrated array) for accomplishing this goal is presented here (other techniques suited to poorly calibrated arrays will be described later).

When the array is well-calibrated, a simple approach for initial jammer subspace estimation is to perform parameter estimation using the existing beamspace data, then substitute these parameter estimates into a model for the dependence of the array's response on those parameters. In the literature, there are many techniques that can be used for the parameter estimation stage. For example, one available technique is beamspace MUSIC, which computes the spectrum:

$$S(\theta) = \frac{1}{s^H(\theta) U_N U_N^H s(\theta)}$$

where $s(\theta)$ is an estimate of the beamspace array response to a jammer from $\theta$, and $U_N$ is a matrix containing the left singular vectors of $Y_k$ corresponding to the N'–J' smallest singular values (i.e., associated with the noise). The J' peaks of $S(\theta)$ are then used as initial estimates for the locations of the J' jammers in acquisition.

Once the peaks have been identified, the associated parameters are substituted into a model for the array's response (often called the manifold), resulting in a suitable initial jammer subspace estimate (306). In practice, the array manifold may be predicted analytically, or may be tabulated via measured data that is collected during an offline "calibration" mode.

Due to the extremely small number of DOFs that are used during the parameter estimation stage (and their suboptimal selection), the initial jammer estimates are likely to contain sizeable error. Furthermore, biased estimators may be in use. Due to these potential errors, initial estimation is followed by refinement.

The final acquisition phase is "refinement." After a jammer detection occurs and its parameters have been initially estimated, the jammer parameters are refined. During this refinement phase, previous estimates of the jammer(s) are used to select a new digital transformation, $T_{k+1}$. The objective is to choose $T_{k+1}$ so that subsequent estimates of the jammer(s) have reduced errors. This is accomplished by pointing a subset of the r refinement beams toward the estimated jammer subspace (external information is needed to do this well, as shall be proven later). These refinement beams may also include extra beams to span the region of error. As was the case for both the main beams and auxiliary beams, the refinement beams should contain nulls steered toward other previously acquired jammers.

After adjusting $T_{k+1}$ and forming $y_{k+1}$, the data at time k+1 will be used to re-estimate the jammer parameters. By selecting $T_{k+1}$ in the manner described above, the new estimate of the jammer parameters is improved. The cancellation of the jamming by the stage 2 adaptive processor is also improved.

The refinement process repeats until the jammer estimates converge (308). Convergence can be identified in several ways. One could, for example, look for convergence of the parameter estimates. Alternatively, one could measure the distance between current and past estimates of the jammer subspace (as derived from the estimated parameters). As a third possibility, one might simply monitor the bias and variance of the estimator, waiting until these are sufficiently small (assuming expressions for these are known for the estimator in use).

When convergence is reached, a final estimate of the jammer is made. If the array manifold is known to a high degree of precision, the final jammer estimate can be made in the same manner as the simple initial estimation method described earlier. Otherwise, a final estimate can be made from the dominant singular vectors of the beamspace data matrix (after transformation back into N dimensional space).

After a final estimate of the jammer subspace is made, CLM-ABF transitions the jammer to the nulling state. The nulling state is now described in detail below.

Suppose that the final estimate of the jamming present at the input to the adaptive processor at time k is $$E_k = [e_1 \ldots e_{J'}]. \tag{4}$$

The vectors $e_1, \ldots, \ldots e_{j'}$ form a basis for the estimated jamming at the input to the adaptive processor at time k. The next digital transformation matrix should be modified to null this jamming (310). This can be accomplished by choosing:

$$T_{k+1} = P_k T_k = P_k P_{k-1} \ldots P_1 T_1. \qquad (5)$$

The matrix $P_k P_{k-1} \ldots P_1$ removes the jamming present in $x_k$. For example, $P_k$ may be a projection matrix, $$P_k = I - E_k (E_k^H E_k)^{-1} E_k^H$$

and thus $P_k P_{k-1} \ldots P_1$ is the product of projection matrices (which is also a projection matrix). Alternatively, the square-root conjugate transpose of jammer covariance estimates may be used (this technique is described in more detail at the end of this section).

Note that in equation (5), by writing the product as $P_k P_{k-1} \ldots P_1$ it appears that all projections from times 1 through k are desired to be accumulated. This would be the case if, after turning on, all jammers were stationary. In practice, one would actually remove projections from the product that correspond to old, out-of-date jammer information. Likewise, one may wish to avoid potential desensitization by removing projections corresponding to jammers near the main beam. Such jammers can be identified, for example, by simply evaluating the angle between the jammer subspace and each main beam. Jammers that are too close are not used in creating $P_k$. This forces the cancellation of main beam jamming to be performed in the stage 2 beamspace adaptive beamformer, and thus near optimal system sensitivity can be maintained. In fact, since jammers are explicitly tracked as part of the adaptation process, other rules can be used to determine which jammers have explicit nulls placed on them by the digital transformation, and which jammers are cancelled by the subsequent beamspace adaptive beamformer 312.

For multimode sensor operation, the jammer parameter information is stored for later use during mode changes. For example, the main beam components of $T_1$ would, in the case of a "horizon search" mode radar, span a wide angular region along the horizon. In the case of a track mode radar, on the other hand, the main beam components of $T_1$ would point toward a specific target. With closed-loop multistage adaptive beamforming, mode switching is implemented by changing $T_1$ (according to the mode) and then re-applying the appropriate jammer nulling transformations. Thus, one can fully reuse the accumulated jammer knowledge.

To summarize, the CLM-ABF control process handles each jammer by first estimating its parameters (i.e., "acquisition"), and then adjusting the stage 1 transformation to steer nulls on the jammer (i.e., "nulling"). However, if these nulls are not adequate for some reason (perhaps as a result of jammer motion, array motion, or simply due to an error in the estimation process), then the jammer estimate must be updated. CLM-ABF updates jammer estimates by transitioning to the "update state," as described below.

To update a jammer estimate, the nulls (corresponding to this jammer) in all N' beams are removed, and instead refinement beams are steered to span the estimated jammer subspace. In effect, transition to the "updating" state amounts to moving a jammer from the "nulling" state to the refinement phase of the acquisition state. This refinement phase continues until a new jammer estimate is completed.

There are two mechanisms that can trigger a transition to the update state. The first way to trigger an update is through a pre-scheduled revisit (314). When a jammer is acquired and a null is steered, the CLM-ABF adaptive processor can no longer "see" the jammer because of the null. For example, if the jammer "turns off" or changes slightly, the CLM-ABF adaptive processor will not easily sense the change. For this reason, periodic updates should be pre-scheduled at the time of acquisition. Typically, this simply means the processor will wait some pre-determined time period and then automatically initiate an update on the jammer.

In choosing the length of time between pre-scheduled revisits, one should consider factors such as the shape of the jammer null and the worst-case predicted motion. The former can be controlled through conventional techniques (e.g., the design of stopband beamformers or via the introduction of array troughs). The later can be derived, for example, from a threat model and/or a long-term jammer track history. Certainly, given the width of the jammer null, and the rate of motion, one can predict the time that will elapse before the jammer moves too far from the center of the null, degrading stage 1 nulling performance.

The second way to trigger an update is through sensing of the data itself. If a jammer changes significantly (so that it is not nulled sufficiently by the stage 1 transformation), it will (of course) be cancelled by the subsequent beamspace adaptive beamforming 312 (assuming enough instantaneously adaptive DOFs exist). At the same time, the residual jamming energy at the output of the digital transformation device should be detected. This, in turn, initiates a new jammer acquisition. During acquisition, jammer parameters are estimated. These parameters are then compared to the set of previously acquired jammers (a process called "association" (306)). If an association occurs (i.e., a near match is found), then the previously acquired jammers that were associated are transitioned to the update state. Note that the second trigger mechanism can act as a failsafe in the event that the pre-scheduled revisit rate is too low.

This concludes the description of the three nominal states CLM-ABF can have with respect to each jamming source. At this time, it is noted that the CLM-ABF control process uses a fourth state, called "initialization" to handle very large changes in the jamming environment. Recall that CLM-ABF has only N' instantaneously adaptive DOFs to use during the acquisition of jammers. If there are more than N' jammers that need to be acquired at any given instant, then there simply aren't enough instantaneously adaptive DOFs to do the job well. Hopefully this is an unlikely event; nonetheless it can occur. It is probably most likely to occur at startup time (since usually the CLM-ABF processor doesn't have any prior information about the jamming environment and thus all jammers are "new" at startup time).

One way to initialize large changes in the jamming environment is to process a larger number of instantaneously adaptive DOFs. This is undesirable, of course, because it adds cost to the system.

Instead, an attempt will be made to limit the number of jammers the CLM-ABF adaptive processor attempts to acquire at any given time. This can be done by using two well-known techniques. First, one can process data in a beamspace consisting of very low sidelobe beams spanning a limited sector only. This has the effect of filtering-out (or attenuating) jammers from outside the sector. Second, one can force the adaptive processor to ignore weaker jammers (initially) by employing a high level of "noise loading". Together, these techniques force the adaptive processor to focus on the strongest jammers within a specific sector. By monitoring the singular values, one can tell if there are still too many jammers; if so, one can either reduce the size of the sector or use more noise loading.

After estimating the strong jammers in a sector, nulls are put on them. This allows for the lowering of the loading level and thus the estimation of the weaker jammers. After all jammers in a given sector are estimated, the process is repeated in other sectors until all jammers have been acquired. One can, of course, reverse the order. That is, search all sectors to acquire the strong sources. Then lower the loading level and repeat the search in each sector to pick out the weaker sources.

Figure 4:
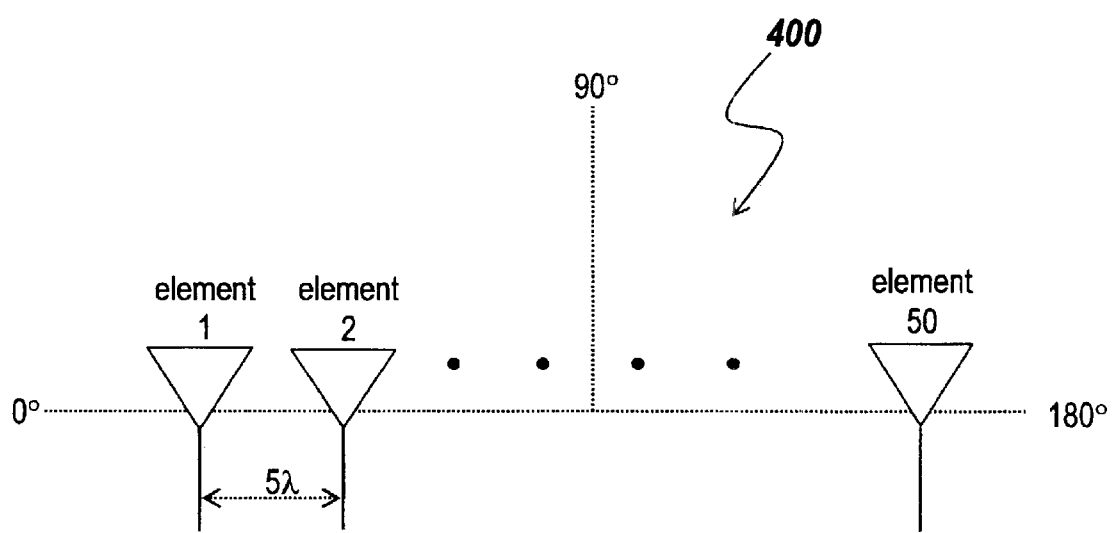
FIG. 4 is a schematic block diagram of a 50-element linear array configuration.

Having described the components of CLM-ABF, as well as its control process and operating states, the potential offered by CLM-ABF will now be illustrated. FIG. 4 is a schematic block diagram of a 50 element linear array configuration 400 (N=50), with angles measured as shown, and where λ equals the wavelength at the center of the operating band. Performance results are given for both CLM-ABF and Beamspace-ABF. In both cases, the first stage of processing digitally transforms the element data into six beams, including a single main beam (steered toward 90°) and five other beams (i.e., n'=1 and m'=5). In the following experiments, whenever directional beams were used, a uniform taper was used.

For Beamspace-ABF, the "other" beams were "internal sidelobe cancellers" (a.k.a. auxiliary elements). These were selected in a pseudo-random fashion (elements 1, 23, 24, 38 and 47 were chosen). For CLM-ABF, the "other" beams were initially all auxiliary beams. These auxiliary beams had broad spatial responses (i.e., nearly all-pass). These auxiliary beams were formed by partitioning the array into overlapping subarrays of 46 elements each, then combining elements within each subarray to form a single auxiliary beam. Of course, CLM-ABF substituted refinement beams when required. It also steered nulls in all stage 1 beam patterns as jammers were acquired. CLM-ABF used the projection matrix method (described above) to steer these nulls.

For both CLM-ABF and Beamspace-ABF, the second processing stage performed adaptive beamforming (i.e., within 312 and 106 respectively) based upon the Sample Matrix Inversion method. After processing, the "Signal to Interference plus Noise Ratio" Loss (SINR Loss) was computed. SINR Loss is a measure of performance that is frequently used in the radar signal processing field. SINR Loss is computed in the following way. First, the expected output power for a desired signal (i.e., a target of interest at the center of the main beam), is computed, and then it is divided by the expected interference (and noise) power at the output. The result is then normalized by the expected SNR of an optimal receiver in a noise-only environment. An SINR Loss of 0 dB simply means that performance is equivalent to that of an optimal receiver in a noise only background. Values less than 0 dB indicate a relative loss. Generally, methods that minimize this loss (i.e., perform near the 0 dB level) are desired.

The stage 2 adaptive beamformer weights were computed once per CPI, using 10·N' training snapshots. CLM-ABF was also permitted to adjust its digital transformation once per CPI, if needed (that is: the time index, k, was equal to the CPI number). As k increased from 1 to 160, jammers "turned on" at intervals of 10 (i.e., at k=1, 11, 21, ..., 151). There were 16 jammers in all. Their angles were 10°, 20°, 30°, 40°, 50°, 60°, 70°, 80°, 100°, 110°, 120°, 130°, 140°, 150°, 160°, and 170°. These jammers appeared in a random order. Each had a JNR of 50 dB per element.

The parameters estimated by CLM-ABF, the estimation algorithm, and the refinement beam selection logic were chosen in a straightforward fashion to suit the degree of array uncertainty (i.e., the level of array calibration). Four cases of varying degrees of array uncertainty were considered: (1) perfectly calibrated arrays, (2) finitely measured array manifolds, (3) unknown mutual coupling, and (4) unknown complex random channel gains.

The description will begin with the simplest of these four cases: perfectly calibrated arrays. For the purpose of this application, perfect calibration is defined as follows. The array's response to a jammer is determined (to within a complex scalar) by the angle of the jammer. Hence, CLM-ABF can fully characterize each jammer (i.e., CLM-ABF wherein projection matrices are used to steer nulls as stated above) by estimating a single parameter, the jammer's direction of arrival. In the example to follow, CLM-ABF used Beamspace Spectral MUSIC to estimate these angles. As estimates were made, refinement beams were steered in the neighborhood of the estimated jammer direction, then the jammer parameter was re-estimated. This continued until convergence was attained for each jammer.

The table of FIG. 5 provides a detailed log of the actions taken by CLM-ABF for each jammer. FIG. 5 shows the times (i.e., CPI numbers) corresponding to CLM control process events. As each jammer appeared, it was detected immediately and an initial estimate was generated. Refinement completed in two iterations.

Figure 6:
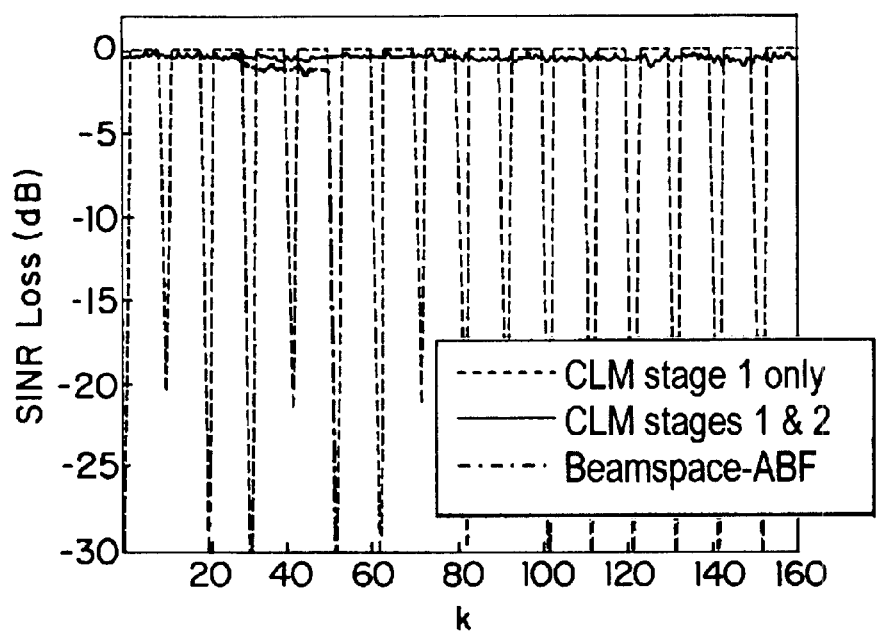
FIG. 6 is a graph of the SINR loss comparison for a perfectly calibrated array.

Overall system performance is characterized in FIG. 6. FIG. 6 is a graph of the SINR loss comparison for a perfectly calibrated array. Observe that the output of the first stage (alone) did quite well after jammers were acquired. During acquisition, however, the sidelobes in the first stage were too high to reject the strong jamming entirely. During this phase, it was the second stage that nulled the new jammers. The combined performance (solid line below) never deviated far from 0 dB.

By comparison, Beamspace-ABF degraded catastrophically at k=51, as the number of active jammers exceeded N'-1. Clearly, CLM-ABF outperformed Beamspace-ABF during this interval. It also outperformed (by a smaller margin) Beamspace-ABF when J<N'-1, due to the closed-loop control.

In many applications including radar, arrays are rarely calibrated perfectly. This can result from finitely measuring the array manifold, mutual coupling, or other errors. CLM-ABF will still perform well in these cases, provided the parameters and estimation procedure are chosen accordingly.

The second example considers the problem of finitely measured array manifolds. One way to calibrate an array is to use an external source. The response of the array to the source (an N dimensional vector) is measured and stored. As the calibration source is moved to a set of known positions, the array's response vectors are recorded and stored in a "manifold table." The manifold table is then simply an N×P matrix, where P is the number of calibration source positions.

In the following example, the array manifold was measured at 180 angles. The cosines of these angles were equally spaced between 1 and -1. Thus, nearly all manifold measurement angles differed from the actual jammer directions. Beamspace Spectral MUSIC was again employed to estimate directions of arrival, assuming knowledge of only the N×P manifold table in the MUSIC search. That is, MUSIC performed its search on this P point grid only; no interpolation was used during MUSIC. Refinement beams, when needed, were chosen to be columns taken from the manifold table. After convergence was reached, the parameter vector and its estimator were changed to the method of final subspace estimation, which will be described hereinafter.

Figure 7:
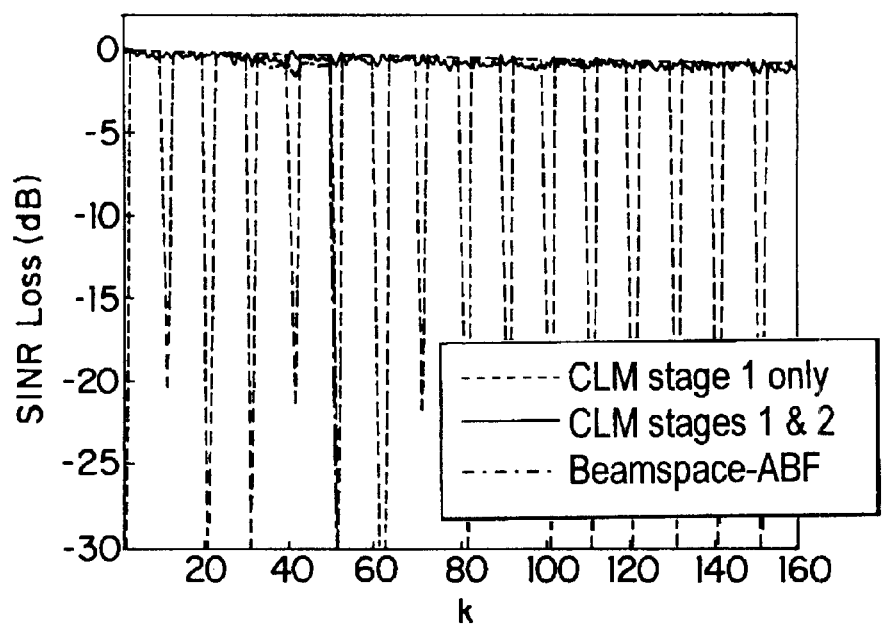
FIG. 7 is a graph of SINR loss with the finite array manifold table.

Overall system performance is characterized in FIG. 7. FIG. 7 is a graph of SINR loss with the finitely measured array manifold. Observe that CLM-ABF performance was excellent despite the incomplete knowledge of the array manifold table.

The third example considers the problem of unknown mutual coupling. Frequently, the response of a sensor is electromagnetically coupled to that of nearby sensors. The effect is called mutual coupling. The coupling parameters are often unknown. Typically, radar arrays are designed to include dummy elements around the perimeter with the goal of making the unknown mutual coupling the same from element to element across the entire array. In this case, the true array response (including mutual coupling), $d_t(\theta)$, would be related to the model-based response (excluding coupling), $d_m(\theta)$, as follows:

$$d_t(\theta) = M \cdot d_m(\theta)$$

where M is an unknown "mutual coupling matrix." For the linear array of FIG. 4, assuming only the adjacent elements are coupled:

$$M = \begin{bmatrix} 1 & \alpha & & & \\ \beta & 1 & \alpha & & \\ & \ddots & \ddots & \ddots & \\ & & \beta & 1 & \alpha \\ & & & \beta & 1 \end{bmatrix}$$

where $\alpha$ and $\beta$ are unknown.

Figure 8:
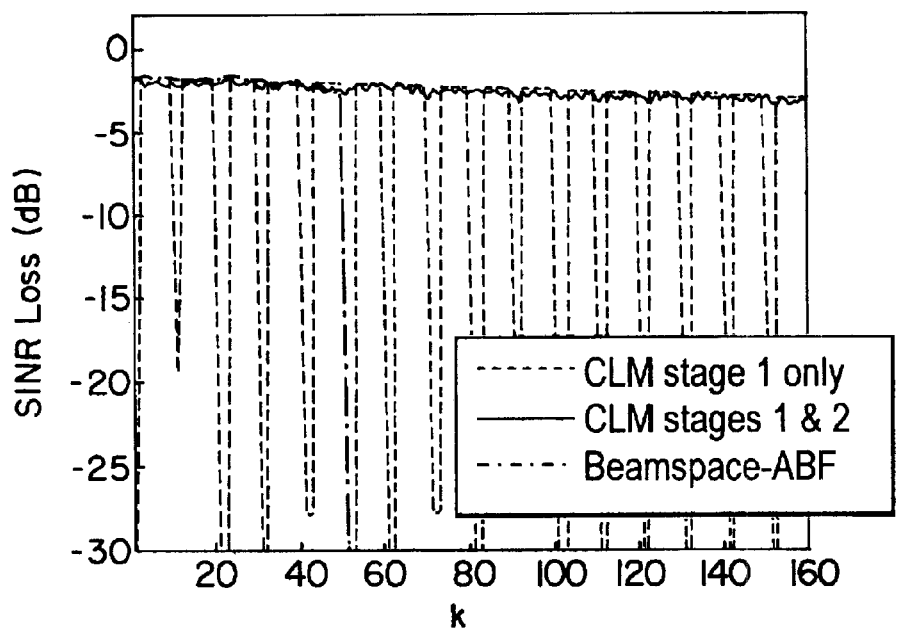
FIG. 8 is a graph of SINR loss with CLM-ABF refinement beams used to span the error due to mutual coupling.

FIG. 8 is a table of SINR loss with CLM-ABF refinement beams used to span the error due to mutual coupling. FIG. 8 illustrates performance when $\alpha$ and $\beta$ are relatively large, i.e. $\alpha = 0.1 e^{j0.6\pi}$ and $\beta = 0.15 e^{-j0.8\pi}$ (i.e., the mutual coupling is attenuated $-20$ dB and $-16.5$ dB, respectively). Observe that CLM-ABF performance was excellent despite the lack of knowledge regarding the element mutual coupling. In this case, MUSIC was used to estimate jammer directions (without knowledge of $\alpha$ or $\beta$), then the refinement beams were steered to span the region of uncertainty. For each jammer direction $\theta$, refinement beams were included that span $d_m(\theta)$, $d_m(\theta)\uparrow$ and $d_m(\theta)\downarrow$ where the later two vectors are upshifted and downshifted versions of $d_m(\theta)$. Note that these three vectors will span the space of all $\alpha$'s and $\beta$'s for a source at $\theta$. After convergence was reached, the parameter vector and its estimator were changed to the method of final subspace estimation described hereinafter.

The table of FIG. 9 provides a detailed log of the actions taken by CLM-ABF for each jammer. The table shows times (i.e., CPI numbers) corresponding to CLM control process events when mutual coupling was present.

Note that other ways to deal with unknown mutual coupling exist. For example, the jammers could be used to directly estimate the coupling parameters. The resulting estimates of these coupling parameters could later be used to improve performance as new jammers appear. In general, performing a separate array calibration, such as this, should improve performance levels.

Figure 10:
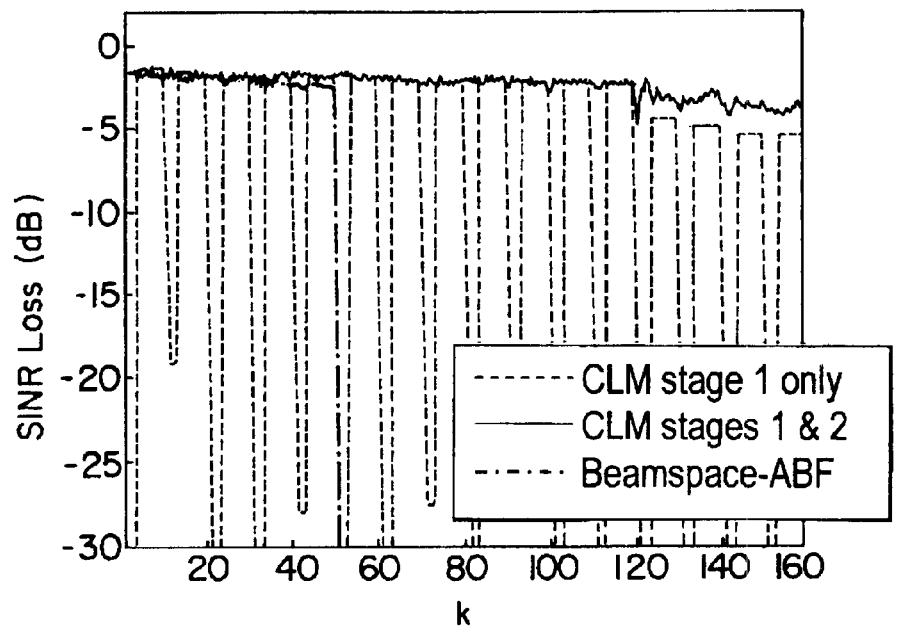
FIG. 10 is a graph of the SINR loss with mutual coupling and CLM-ABF refinement beams chosen to include "snapshot" beams.

Another alternative is to modify the selection of refinement beams to more closely span the jamming without employing knowledge of the structure of the coupling matrix. In FIG. 10, the remaining refinement beams were chosen as follows. One beam was taken to be a single randomly selected N-dimensional snapshot (modified to include nulls steered toward previously acquired jammers, of course). Another beam was taken to be the dominant eigenvector of $Y_k$ (transformed back into N-space and nulled as above). The remaining beams were chosen to span the angular region around the estimated jammer position. Observe that CLM-ABF performance in FIG. 10 is good despite the lack of information regarding the structure of the mutual coupling matrix.

The fourth example considers the problem of unknown random channel gains. A challenging situation arises when the true array response is related to the presumed model via:

$$d_t(\theta) = r \circ d_m(\theta) \qquad (6)$$

where r is a random vector and $\circ$ denotes the Hadamard (i.e., point-by-point) vector product.

Figure 11:
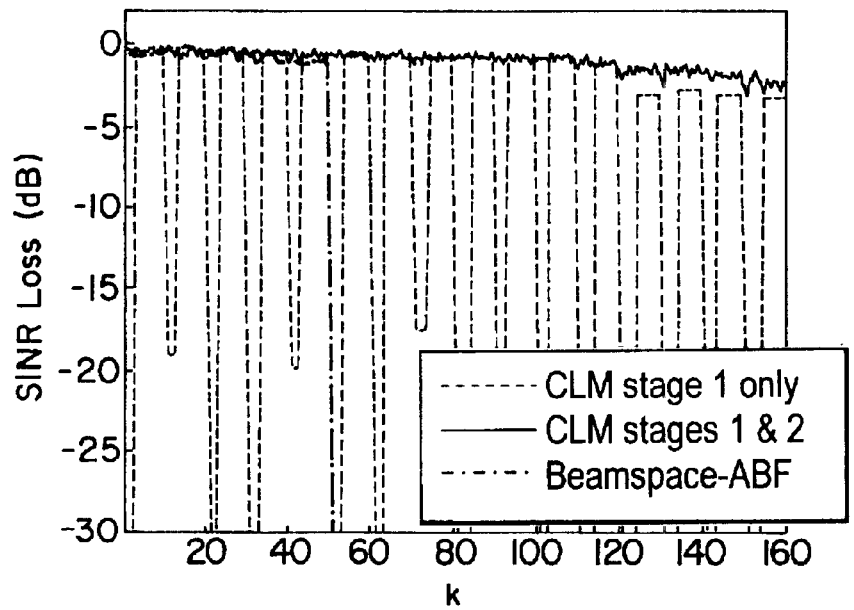
FIG. 11 is a graph of SINR loss with random channel gains and CLM-ABF refinement beams chosen to include "snapshot" beams.

FIG. 11 illustrates performance when the elements of the vector r were realizations of independent complex Gaussian random variables of mean=1, variance=$-25$ dB. CLM-ABF refinement beams were chosen to include a nulled snapshot vector and an eigenvector (as used in FIG. 10), as well as several beams spanning the angular region about the estimated jammer position. Performance was excellent.

Figure 12:
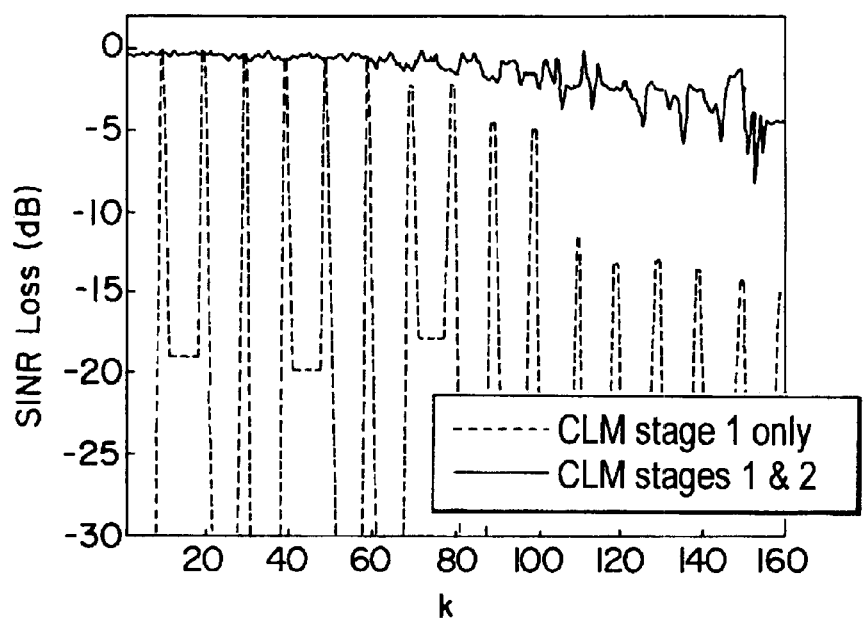
FIG. 12 is a graph of SINR loss with random channel gains and CLM-ABF refinement beams chosen to rotate through available subarrays.

FIG. 12 illustrates performance of CLM-ABF while still another refinement beam selection process was employed. Here, after each jammer was detected, the principal eigenvector was computed and transformed into N-space where it was used as a refinement beam (nulled, of course). The other refinement beams were chosen to form a subarray of m'−1 elements. On each successive refinement, subarrays of different elements were chosen. This refinement beam selection process was repeated until all elements had been visited. To ensure all elements were visited, this example used N'=11. Again, aggregate performance appears to be good.

To summarize, in each of the four examples the closed-loop multistage adaptive beamformer successfully removed all 16 jammers with only six instantaneously adaptive DOFs. The idea behind CLM-ABF is to break the adaptive processor into two stages connected by a data link and a feedback control link. As each new jammer appears, cancellation is initially achieved through conventional beamspace adaptive beamforming. However, by carefully selecting the beamspace transformations, the jammers are estimated and the nulling job is soon passed on to the first stage. Thus, a relatively low DOF processor is used to control a much larger number of DOFs. This permits lower cost processor and array hardware. Furthermore, CLM-ABF uses a closed-loop method for selecting its beamspace transformations. There is a big advantage to this closed-loop approach. Closed-loop control provides rapid, automatic sensing of changes in the interference environment (and re-steering of the beamspace transformations). In general, this leads to a performance advantage (e.g., due to faster beam steering—and thus improved nulling of interference). It also leads to a cost advantage (e.g., because beams are only adjusted when needed and these beams are controlled by a processor that operates in a reduced N'-dimensional beamspace). It also permits high-fidelity parameter estimation, and thus steering of jammer nulls (in the stage 1 transformation) that exceed the usual limits on nonadaptive sidelobe attenuation (a limit that is typically driven by array manifold and calibration errors). The nulling achieved by the first stage transformation can be complete or nearly complete, even for very strong jammers. Furthermore, any residual interference that remains at the output of the first stage is automatically removed by the second stage. In contrast, conventional Beamspace-ABF (using the same number of instantaneously adaptive DOFs) showed considerable degradation. To improve such methods to the level exhibited by the beamformer would require many more DOFs and the associated hardware.

This concludes the description of CLM-ABF with the exception of three analytical details to be addressed below. The first of these analytical details relates to the use of "external information" by CLM-ABF.

In the baseline CLM-ABF architecture of FIG. 2, the current instantaneous jammer estimate, i.e., the jammer estimate made by the adaptive processor by using the currently available set of N' instantaneously adaptive DOFs, is combined with external information to create the next digital transformation. It will now be proven that such external information is necessary to null more than N'=1 strong jammers.

Suppose a jammer is present at time k. Let j denote its N×1 subspace. Assume this jammer is detected and a unit norm initial subspace estimate, $\hat{j}_0$, is somehow formed directly from only the beamspace data (e.g., by using the principal eigenvector of $R_k$), i.e., no external information is used.

At this point, refinement beams must be selected. Transforming the jammer estimate into N-space results in $\tilde{j}_0 = T_k \hat{j}_0$. The quantity $\tilde{j}_0$ is called a "direct" N-dimensional estimate of the jammer because it is formed directly from the beamspace data. Suppose $\tilde{j}_0$ is used directly as a refinement beam. Note that, by definition, this beam lies in the column space of $T_k$. Hence, the incorporation of $\tilde{j}_0$ into the definition of $T_{k+1}$ will not result in a change in column space compared with $T_k$. Consequently, the subsequent (refined) direct jammer estimate, $\hat{j}_1 = T_{k+1} \tilde{j}_1$, will lie in the same beamspace as $\tilde{j}_0$.

Now, suppose convergence is reached at time k+1. Then, a digital transformation that nulls the jammer will be created. To do this directly, one could first transform $\hat{j}_1$ into N-space, $\tilde{j}_1 = T_{k+1} \hat{j}_1$. Then, a nulling transformation is formed, e.g., $P_{k+1} = I - \hat{j}_1 \hat{j}_1^H$. Finally, this is applied to get a new set of jammer-nulled beams, $$T_{k+2} \equiv P_{k+1} T_{k+1} = T_{k+1} T_{k+1} \hat{j}_1 \hat{j}_1^H T_{k+1}^T T_{k+1}. \quad (7)$$

This transformation will null the jammer because in the limit (i.e., as $\hat{j}_1 \to T_{k+1}^H j_1$), the beamspace jammer signal at time k+2 (assuming $T_{k+1}$ has orthonormal columns) is:

$$T_{k+2}^H j = T_{k+1}^H j - (T_{k+1} \hat{j}_1 \hat{j}_1^H T_{k+1}^H T_{k+1})^H j = 0 \quad (8)$$

As a result, only N'=1 jammers can be nulled using this direct approach. This is shown by considering instead the beamspace projection matrix:

$$P_{bs} = I - \hat{j}_1 \hat{j}_1^H. \quad (9)$$

Applying $P_{bs}$ to the beamspace data at time k+2 is equivalent to applying the transformation matrix:

$$T_{k+1} P_{bs} = T_{k+1} \hat{j}_1 \hat{j}_1^H \quad (10)$$

to the N-space data because $P_{bs}^H y_{k+2} = P_{bs}^H T_{k+1}^H x_{k+2}$. Moreover, each time a projection such as (9) is used, one component of the N' dimensional beamspace is removed (by definition). Clearly, this can be done at most N'=1 times while still retaining the target.

Finally, compare the direct approach of (7) to the beamspace projection of (10). Because $T_k^H T_k = I$, the two equations are equivalent, proving that direct estimation of the jamming (without external information) limits nulling to N'−1 strong jammers.

On the other hand, suppose external information is used in estimating the jammer. Using external information implies the N-space jammer estimate, $\tilde{j}_0$, does not lie in the column space of the digital transformation. That is, $\tilde{j}_0 \ne T_k \hat{j}_0$. Consequently the rank of $T_{k+2} = P_{k+1} T_{k+1}$ is not necessarily lower than the rank of $T_{k+1}$, allowing for the nulling of more than N'−1 jammers.

A qualitative interpretation of this result is as follows. If the $\tilde{j}_0$'s and $\hat{j}_1$'s live within a single N' dimensional beamspace (i.e., the column space of $T_k$), one cannot remove more than N'−1 jammers and still see the target. To remove more jammers, the $\tilde{j}_0$'s and $\hat{j}_1$'s must be allowed to shift out of this N'-space. Unfortunately, the data at the input of stage 2 contains no information about jammer components outside the column space of $T_k$. Thus, any refinement beams (or jammer estimates) derived directly from this data will be confined to this N'-space. Moreover, nulling transformations derived directly from this data will not remove jamming components outside the column space of $T_k$.

On the other hand, if external information is used to help form the $\tilde{j}_0$'s and $\hat{j}_1$'s, then more than N'−1 jammers can be removed. This is because the estimates are not confined to a single N' dimensional beamspace.

How this "external information" is obtained depends on factors such as the array uncertainty. Several examples were previously given. For a well-calibrated array, the external information was the array manifold. For the case where mutual coupling was an issue, the coupling model and the manifold table together permitted the span of the jammer subspace as in FIG. 8. Alternatively, an array snapshot can be used as in FIG. 10. In other cases, it was possible to rotate the subarrays that were used for jammer estimation as in FIG. 12. In this case, the estimate of $\tilde{j}_0$ was formed slowly over time. At each time step, the current digital transformation was chosen to permit estimating a different piece of $\tilde{j}_0$. For large arrays, this approach will be time consuming if all of the N components are to be estimated. However, it may be possible to estimate a small number of the components and apply a spatial/temporal version of wideband synthesis (See Cuomo, U.S. Pat. No. 5,945,940, incorporated herein by reference) to interpolate and extrapolate the remaining components.

The second analytical detail that remains to be addressed is the formation of final subspace estimates. As described heretofore, a final estimate of the new janmuer subspace can be extracted from the singular vector(s) associated with the maximum singular value(s). Under the right conditions, this is a maximum likelihood estimator. However, for this estimate to be "high quality", the refinement beam selection process must result in a beamspace that closely spans the jammer. This has been shown to be possible in the various examples provided herein.

It is worth noting that, during refinement, all beams will have nulls steered toward previously acquired jammers. Thus, the beamspace cannot span the new jammer entirely (i.e., the singular vectors will contain little information in the directions of the nulls). Thus, final estimates based upon singular vectors should be augmented to provide information in these directions. For example, if projections ($P_{k-1} \ldots P_1$) are used to place nulls in the beamspace data $Y_k$, then a suitable jammer subspace estimate might be:

$$\hat{j} + \alpha(I - P_{k-1} \ldots P_1) d_m(\theta)$$

where $\tilde{j}$ is the principal eigenvector of $R_k$ (transformed into N-space), $d_m(\theta)$ is the N×1 array response vector to a signal from the estimated jammer direction, $\theta$, and $\alpha$ is a complex scalar that coheres the two components.

The third (and final) analytical detail to be addressed relates to the conditions under which CLM-ABF optimally rejects interference. In the absence of estimation errors, closed-loop multistage adaptive beamforming can be formulated to achieve optimal interference rejection. That is, $$\tilde{w}_k = g_k, \quad (11)$$

where $g_k = C_k^{-1}d$ is the optimal Wiener filter, and $C_k = E\{x_k x_k^H\}$ is the data covariance at time k.

Understanding the circumstances leading to (11) gives insight into possible methods of beam selection. Suppose $C_k = C_A + C_B$ where $C_A$ and $C_B$ are covariance matrices for jammers A and B. Suppose $C_A$ is known, but not $C_B$. The weights can be calculated by using a digital transformation matrix that pre-whitens against jammer A, $$w_k = \left(C_A^{-1/2} C_k C_A^{-1/2^H}\right)^{-1} C_A^{-1/2} d$$

$$= \left(I + C_A^{-1/2} C_B C_A^{-1/2^H}\right)^{-1} C_A^{-1/2} d.$$

This is equivalent to optimal processing because $$\tilde{w}_k = C_A^{-\frac{1}{2}H} w_k = g_k. \quad (12)$$

Despite (12), the stage 1 transformation $C_A^{-\frac{1}{2}}$ is of little direct value because it does not reduce the number of instantaneously adaptive DOFs. Fortunately, it has been noted that one can simultaneously whiten and transform the data into a reduced DOF space while still matching the optimal filter. To accomplish this, an aggregate digital transformation equal to $C_A^{-\frac{1}{2}H}B$ must be used where $$B = \text{span}([C_A^{-\frac{1}{2}} dV]), \quad (13)$$

and the columns of V span the space of the principal eigenvectors of $C_A^{-\frac{1}{2}} C_B C_A^{-\frac{1}{2}H}$. It is easy to show that these are also the principal eigenvectors of $C_A^{-\frac{1}{2}} C_B C_A^{-\frac{1}{2}H}$. This is fortunate because this is a matrix that could be estimated if there were access to the full DOF (i.e., N dimensional) data.

However, CLM-ABF does not have access to the full DOF data. Instead, it examines a transformed version of this matrix, $T^H C_A^{-\frac{1}{2}} C_k C_A^{-\frac{1}{2}H} T$. The relevant question is then what T will allow a good estimate of the dominant subspace of $C_A^{-\frac{1}{2}} C_k C_A^{-\frac{1}{2}H}$. Clearly a T is needed such that $$j = TT^H j \quad (14)$$

for all j's corresponding to the jammer subspace. That is, j must be in the row space of $T^H$. Recall that the columns of T are orthonormal. Thus, T is the pseudo-inverse of $T^H$, i.e., it maps the column space of $T^H$ back to the row space of $T^H$. The observations lie in this column space. Consequently, if $u_i$ is an eigenvector within the dominant subspace of $T^H C_A^{-\frac{1}{2}} C_k C_A^{-\frac{1}{2}H} T$, and T satisfies (14), then $Tu_i$ is a principal eigenvector of $C_A^{-\frac{1}{2}} C_k C_A^{-\frac{1}{2}H}$.

In summary, choosing T to satisfy (14) will permit one to construct a B to satisfy (13). CLM-ABF iteratively adjusts T in a way that should approximately satisfy (14). Thus, optimal cancellation is possible with CLM-ABF in the limit.

To achieve optimum performance as shown above, CLM-ABF's second stage must use some of its instantaneously adaptive DOFs. CLM-ABF does not want to operate this way for long. Instead, it wants to re-allocate those DOFs for other uses (e.g., new jammers). To accomplish this, CLM-ABF will transfer the subspace information to its first stage by constructing a subsequent transformation that completes the whitening of $C_k$, i.e., $$C_{B'}^{-\frac{1}{2}} C_A^{-\frac{1}{2}} C_k C_A^{-\frac{1}{2}H} C_{B'}^{-\frac{1}{2}H} = I$$

where $$C_{B'}^{-1} = \sum_i \lambda_i^{-1} T u_i u_i^H T.$$

At this point, jammer B is said to be "transitioned" to the nulling state.

After the transition has occurred, the entire acquisition/nulling can begin anew. That is, if a new jammer appears at subsequent time k', $C_k$, is substituted for $C_k$ and $C_{B'}^{-\frac{1}{2}} C_A^{-1/2}$ for $C_A^{-\frac{1}{2}}$ above. Thus, CLM-ABF can once again construct a T and a filter that approaches optimal.

In conclusion, CLM-ABF (in the absence of estimation errors) tries to initially steer its stage 1 beams so that its composite weight vector yields the optimal weights. When the convergence criteria is met, the stage 1 transformation is adjusted to perform more complete cancellation, thus freeing-up DOFs in the second stage.

One important caveat is that the matrix $C_{B'}^{-1/2}$ depends on a particular choice of $C_A^{-\frac{1}{2}}$. If jammer A changes and $C_A^{-1/2}$ is updated, $C_{B'}^{-1/2}$ should also be modified. Also, because estimation errors will inevitably be present and subspace information may get stale, the projection approach and the null pattern control method are considered as robust ways to perform the nulling.

The following tables are provided for definitions of nomenclature and terminology, respectively.

TABLE 1

Nomenclature

| Nomenclature | Meaning |
| --- | --- |
| N | Total number of digitized channels produced by the sensor array. |
| $x_k$ | An N × 1 vector of samples (a.k.a. the snapshot vector) at time k |
| $X_k$ | A set of N × 1 sample vectors, i.e., $X_k = [x_k^1 \ x_k^2 \ \ldots \ x_k^L]$ where the $x_k^i$ are different snapshot vectors from "time" k, and L is the number of snapshots. To clarify, consider a radar example. In radar, one can think of k as the CPI index, and $x_k^i$ as the $i^{th}$ fast-time sample (i.e., range sample) collected during CPI k. |
| T | A fixed beamspace transformation. Each column of this matrix can be thought of as a beam (or subarray or sidelobe canceller, depending on the values). |
| $T_k$ | A data-dependent beamspace transformation |
| N' | Number of beams at the output of a beamspace transformation |
| $y_k$ | An N' × 1 vector of samples (a.k.a. the beamspace snapshot vector) at time k |
| $Y_k$ | A set of N' × 1 beamspace snapshot vectors, i.e., $Y_k = [y_k^1 \ y_k^2 \ \ldots \ y_k^L]$ where the $y_k^i$ are different snapshot vectors from "time" k, and L is the number of snapshots. |
| $R_k$ | The beamspace correlation matrix at time k |
| $w_k$ | The beamspace adaptive weight vector applied at time k |
| J | Total number of interference sources present |
| J' | Total number of interference sources present after stage one nulling in CLM-ABF |

TABLE 2

Terminology

| Terminology | Meaning (in the context of this application) |
|---|---|
| Sensor Array | A collection of sensors that sample an incident waveform. The work involves radar, in which the sensors are antennas. The presentation will focus on this special case. However, one can also consider other types of sensors. Moreover, the "array" notion can easily be generalized to include tapped delay lines behind each sensor. Thus, one could consider temporal-only processing (i.e., a single physical sensor that is repeatedly sampled and processed) as a special case. The duality between multi-sensor arrays and single-sensor multi-sample processing is well known and understood. |
| Direction | In the context of pure multi-sensor array processing, "directions" are angle(s) measured with respect to an array reference point. However, as intended here, the notion could also incorporate spatial and/or temporal characteristics of a signal, in the same manner as "sensor array" can be generalized. For example, polarity could be lumped in under the term direction. |
| Parameter Vector | A vector of parameters describing a jamming signal as it is received by the array. The elements of this parameter vector may be application dependent. A parameter vector could, for example, include a jammer's direction, power, polarization; or even its array response. In the case of wideband jamming, one may generalize this to include a basis for the jammer subspace. |
| Channel | A source of data samples (again, these could be spatial and/or temporal). In this report, channels are generally assumed to be independent. |
| Beam | A data stream created by linearly combining channels. This broad definition includes not only "beams" as they are conventionally defined, but also subarrays, sidelobe cancellers, and other linear combinations of channels. (Note: a beam can be called a channel, though a channel is not necessarily a beam). |
| Jammer | Any low-rank interference source that is correlated from channel to channel. |
| Beamspace Transformation | (1) The process of forming beams (typically fewer outputs than inputs). (2) A device that is used to form beams as above. |
| DOF | Degree of Freedom. Used in the context of beamforming to refer to a channel of data that is combined (with other channels) to form a beam. |
| Fixed DOF | A channel that is non adaptively combined with other channels. "Non adaptively combined" means that the filter that processes the channel prior to summing it (with other channels) is not selected via a control rule that extracts information about the interference environment. |
| Adaptive DOF | A channel that is adaptively combined with other channels. "Adaptively combined" means that the filter that processes the channel prior to summing it (with other channels) is selected via a control rule that extracts information about the interference environment. |
| Instantaneously Adaptive DOF | An adaptive DOF that is currently being manipulated in an adaptive manner. |
| Full ABF | A class of ABF techniques. A Fully Adaptive Beam Former employs N instantaneously adaptive DOFs. |
| Beamspace ABF | A class of ABF techniques. A Beamspace Adaptive Beam Former uses a fixed beamspace transformation followed by adaptation on the outputs of this transformation. (Usually the beamspace transformation is chosen to have fewer outputs than inputs). |
| CLM-ABF | A new class of ABF techniques. CLM-ABF uses a data-dependent beamspace transformation followed by adaptive processing of the outputs of this transformation. The beamspace transformation is controlled by the adaptive processor and provides nulling of interference sources. |

Although the present invention has been shown and described with respect to several preferred embodiments thereof, various changes, omissions and additions to the form and detail thereof, may be made therein, without departing from the spirit and scope of the invention.

What is claimed is:

1. A system for tracking ambient signals, detecting or receiving desired signals, and suppressing undesired signals, comprising:

an array of sensors through which ambient signals are received, said array generating N channels of data, wherein N is an integer greater than zero;

a transformation device that accepts the data from said array and generates N' channels of data, wherein N' is an integer greater than zero;

an adaptive processor that accepts the N' channels of data from the output of the transformation device, said adaptive processor processes the N' channels of data to update the settings of said transformation device, such that only N' degrees of freedom are adaptively manipulated by said adaptive processor at any instant, the manipulation being done in a manner that instantaneously senses changes in signal environment and adjusts the settings of said transformation device in a closed-loop, wherein said adaptive processor controls all N degrees of freedom adaptively over time, thus nulling and tracking performance is then limited by the N degrees of freedom and not the N' degrees of freedom that are actually used adaptively at any instant.

2. The system of claim 1, wherein said transformation device utilizes control information supplied by said adaptive processor to generate said N' channels of data.

3. The system of claim 1, wherein the number of channels N' is fixed.

4. The system of claim 1, wherein the number of sources of ambient signals can exceed the number of channels N'.

5. The system of claim 1, wherein said adaptive processor combines the number of channels N' to produce at least one system output beam that removes residual interference passing through said transformation device.

6. The system of claim 1, wherein the nulling and/or tracking adjusts to calibration errors.

7. The system of claim 1, wherein the transformation device is digital.

8. The system of claim 1, wherein the N' outputs of the transformation device span the space of n' main beams, and m' related beams, wherein n' and m' are integers greater than zero.

9. The system of claim 8, wherein the main beams are chosen to enhance target detection and estimation or signal reception, and the related beams are chosen to detect and estimate jammers, and to enhance the nulling of jammers.

10. The system of claim 9, wherein the main and related beams have nulls steered toward acquired jammers.

11. The system of claim 1, wherein the m' related beams comprise r refinement beams and a auxiliary beams, wherein m', r and a are integers greater than zero.

12. The system of claim 11, wherein both r and α can be adjusted by the adaptive processor, the sum r+α being equal to m'.

13. The system of claim 11, wherein the auxiliary beams cover the region corresponding to all possible jammers.

14. The system of claim 11, wherein the refinement beams are chosen to have responses that span certain estimated jammer subspaces so to improve subsequent estimates of the jammer parameter vector.

15. The system of claim 1, wherein the adaptive processor estimates jammers in a closed-loop fashion and sends control information to the transformation device which is used to steer beams at some sources and directions, while steering nulls at other sources.

16. The system of claim 1, wherein said adaptive processor comprises a detection subsystem, an estimation subsystem, a beam selection subsystem, and a beamforming subsystem.

17. The system of claim 16, wherein said beam selection subsystem is operable for testing for convergence of estimates, and association with other estimates.

18. The system of claim 17, wherein prior to convergence, the estimation subsystem outputs are used to steer refinement beams, and after convergence, the estimation subsystem outputs are used to steer nulls at estimated jammers.

19. The system of claim 1, wherein said adaptive processor automatically senses when nulls are steered badly, and initiates updates.

20. The system of claim 1, wherein said adaptive processor performs pre-scheduled updates.

21. The system of claim 1, wherein said adaptive processor lowers update rates by artificially widening jammer nulls.

22. The system of claim 1, wherein said adaptive processor uses jammer track history and array platform motion data to adjust nulls steered toward acquired jammers, thereby lowering the required update rate.

23. The system of claim 16, wherein said beam selection subsystem utilizes tracked jammer information to select whether or nor to use the transformation device to steer nulls at the jammer.

24. A method of tracking ambient signals, detecting or receiving desired signals, and suppressing undesired signals, comprising:

receiving ambient signals with an array of sensors, said array generating N channels of data, wherein N is an integer greater than zero;

receiving the data from said array with a transformation device and generating N' channels of data, wherein N' is an integer greater than zero;

receiving the N' channels of data from the output of the transformation device with an adaptive processor, said adaptive processor processing the N' channels of data to update the settings of said transformation device, such that only N' degrees of freedom are adaptively manipulated by said adaptive processor at any instant, the manipulation being done in a manner that instantaneously senses changes in signal environment and adjusts the settings of said transformation device in a closed-loop, wherein said adaptive processor controls all N degrees of freedom adaptively over time, thus nulling and tracking performance is then limited by the N degrees of freedom and not the N' degrees of freedom that are actually used adaptively at any instant.

* * * * *

UNITED STATES PATENT AND TRADEMARK OFFICE
CERTIFICATE OF CORRECTION

PATENT NO. : 6,598,014 B1
DATED : July 22, 2003
INVENTOR(S) : Rabideau et al.

It is certified that error appears in the above-identified patent and that said Letters Patent is hereby corrected as shown below:

Column 3,
Line 42, should read -- $z_k = \mathbf{w}_k^H \mathbf{y}_k$ --

Line 46, should read -- $\mathbf{R}_k = E\{\mathbf{y}_k \mathbf{y}_k^H\}$ --

Column 7,
Line 30, should read -- $\mathbf{R}_k = E\{\mathbf{y}_k \mathbf{y}_k^H\}$ --

Column 10,
Line 67, should read -- $\mathbf{E}_k = [\mathbf{e}_1 \quad \cdots \quad \mathbf{e}_{J'}]$ --

Column 17,
Lines 15, 49 and 64, "N'–1" should read -- N'-1 --

Line 24, should read -- $\tilde{\mathbf{j}}_0 = \mathbf{T}_k \hat{\mathbf{j}}_0$ --

Line 41, Equation 7 should read -- $\mathbf{T}_{k+2} \equiv \mathbf{P}_{k+1}\mathbf{T}_{k+1} = \mathbf{T}_{k+1} - \mathbf{T}_{k+1}\hat{\mathbf{j}}_1\hat{\mathbf{j}}_1^H \mathbf{T}_{k+1}^H \mathbf{T}_{k+1}$ --

Line 59, Equation 10 should read -- $\mathbf{T}_{k+1}\mathbf{P}_{bs} = \mathbf{T}_{k+1} - \mathbf{T}_{k-1}\hat{\mathbf{j}}_1\hat{\mathbf{j}}_1^H$ --

Column 18,
Line 49, should read -- …a final estimate of the new jammer subspace… --

Column 19,
Line 31, Equation 12 should read -- $\tilde{\mathbf{w}}_k = \mathbf{C}_A^{-1/2^H}\mathbf{w}_k = \mathbf{g}_k$ --

Line 39, should read -- $\mathbf{C}_A^{-1/2^H}\mathbf{B}$ --

Line 42, Equation 13 should read -- $\mathbf{B} = span([\mathbf{C}_A^{-1/2}\mathbf{d} \quad \mathbf{V}])$ --

Line 44, should read -- $\mathbf{C}_A^{-1/2}\mathbf{C}_B\mathbf{C}_A^{-1/2^H}$ --

Lines 45, 52 and 63, should read -- $\mathbf{C}_A^{-1/2}\mathbf{C}_k\mathbf{C}_A^{-1/2^H}$ --

Column 20,
Line 11, should read -- $\mathbf{C}_{B'}^{-1/2}\mathbf{C}_A^{-1/2}\mathbf{C}_k\mathbf{C}_A^{-1/2^H}\mathbf{C}_{B'}^{-1/2^H} = \mathbf{I}$ --

Line 62, should read -- … $\mathbf{Y}_k = [\mathbf{y}_k^1 \quad \mathbf{y}_k^2 \quad \cdots \quad \mathbf{y}_k^L]$ where the $\mathbf{y}_k^i$ are….. --

UNITED STATES PATENT AND TRADEMARK OFFICE
CERTIFICATE OF CORRECTION

PATENT NO.     : 6,598,014 B1
DATED          : July 22, 2003
INVENTOR(S)    : Rabideau et al.

It is certified that error appears in the above-identified patent and that said Letters Patent is hereby corrected as shown below:

Column 22,
Lines 54-55, should read -- ...comprise r refinement beams and α auxiliary beams, wherein m' r and α are integers... --

Signed and Sealed this

Seventeenth Day of February, 2004

JON W. DUDAS
*Acting Director of the United States Patent and Trademark Office*